April 12, 1960     J. HUGUENIN     2,932,369
JOINT STRUCTURE FOR FRAME MEMBERS
Filed Oct. 23, 1956     3 Sheets-Sheet 1

April 12, 1960     J. HUGUENIN     2,932,369
JOINT STRUCTURE FOR FRAME MEMBERS
Filed Oct. 23, 1956            3 Sheets—Sheet 2
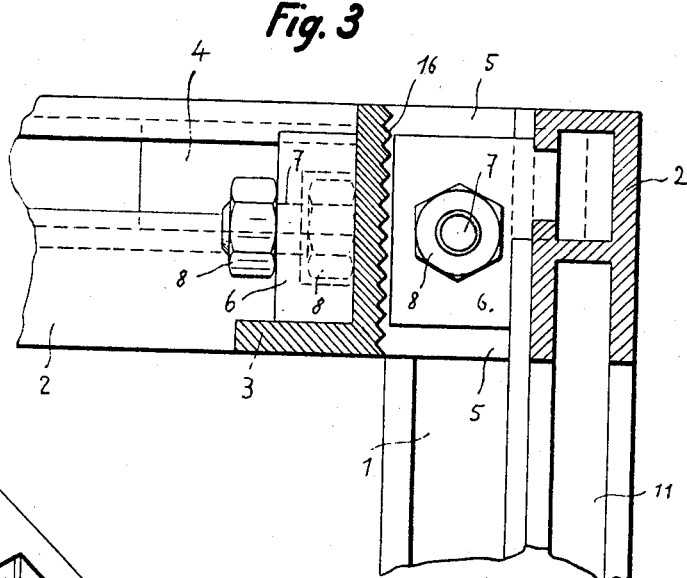
*Fig. 3*
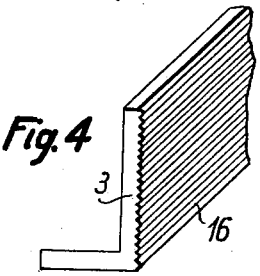
*Fig. 4*
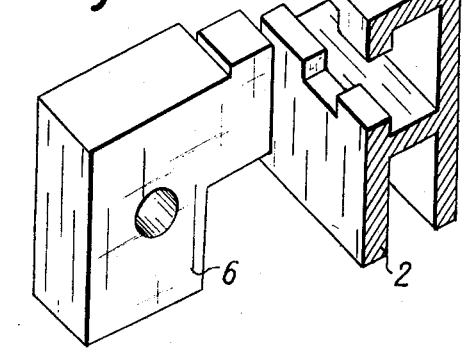
*Fig. 14*
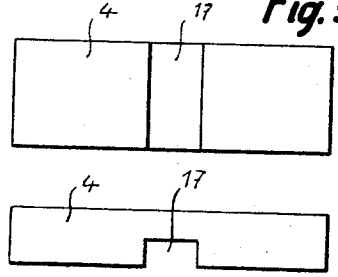
*Fig. 5*
*Fig. 6*
INVENTOR
Jacques HUGUENIN
BY:
ATTORNEY April 12, 1960 J. HUGUENIN 2,932,369
JOINT STRUCTURE FOR FRAME MEMBERS
Filed Oct. 23, 1956 3 Sheets-Sheet 3

United States Patent Office 2,932,369
Patented Apr. 12, 1960

2,932,369
JOINT STRUCTURE FOR FRAME MEMBERS
Jacques Huguenin, Le Locle, Switzerland
Application October 23, 1956, Serial No. 617,788
Claims priority, application Switzerland October 26, 1955
8 Claims. (Cl. 189—36)

The construction and execution of articles of furniture intended for industrial or commercial use often presents very complex problems. In fact an article of furniture intended for industrial use must fulfil several conditions namely: robustness, resistance to wear, and ready adaptability to very many uses, without mentioning aesthetic qualities which sometimes come into the question in the case of industrial fittings. In some cases it is possible to satisfy partially one or other of these conditions by producing an article of furniture in wood which is adapted to the actual needs or by producing an article of furniture in steel which, although very robust, does not always come up to expectations on the practical plane. But on the other hand it is practically impossible to fulfil all the conditions, the more so if one includes the question of cost.

In the field of furniture intended for commercial use, there is not only the necessity of being practical but also the question of aesthetic effect. Indeed, the fittings of a shop must be both pleasant and practical so as to be appropriate to the functions for which they are intended. Moreover it should be possible to extend or modify fittings without its being necessary to replace almost the whole of the existing furniture. In this field, the use of steel furniture nearly always entails a certain uniformity which is contrary to the objects in mind from the aesthetic point of view. On the other hand, use of wood makes it possible to give a personal and characteristic touch to each layout, but the complexity and diversity of shop fittings is such that each construction requires considerable work and therefore becomes very expensive, whilst there is no guarantee that changes or extensions are possible without requiring considerable transformation of the existing furniture.

The object of the present invention is precisely to make it possible, by a device for assembling metal elements in the form of special section members, to construct furniture or other articles in the field of fittings which can meet the most varied requirements. This device, the essential features of which are based on the use of standardised and interchangeable metal elements, permits the rapid construction of very diverse fittings or furniture and makes it possible to carry out modifications or extension starting from the existing elements. Moreover wood or plastic materials can be used in the construction of such furniture as a decorative element whilst allowing the assembled furniture to retain the strength of metal furniture. In order to construct a specific article of furniture it is sufficient to make an appropriate choice of section members, which are cut to length and are perfectly squared and to assemble them to form a framework constituted of metal elements between which it is possible to position panels of any material, such as wood, plastics, etc, or other elements for making up an article of furniture, such as a drawer, shelf, door, etc.

The device in question is characterised by the assembly of uprights and cross-members constituted by sections of a particular shape, by means of detachable elements comprising a tongue engaging into the corresponding grooves of the section members, and an angle member fits into the cross-section of the uprights and has one of its faces ribbed to co-operate with a corresponding surface of one cross-member, the whole being held clamped rigidly by means of a key and a threaded pin co-operating with one or more nuts, one of which is lozenge-shaped.

An illustrative embodiment of the present invention is represented in the accompanying drawings.

In order to facilitate the description and understanding of the invention, we shall describe the assembly of a vertical corner upright with three horizontal cross-members, one acting as a slide. This assembly could constitute, for example, the upper left-hand corner of an article of furniture comprising shelves or drawers.

Fig. 3 is a vertical transverse sectional view of the assembly in Fig. 1, the section being taken along line III—III in the latter figure and is as viewed by one standing behind the arrows and looking in the direction of the arrows.

Fig. 4 is a perspective view of a cross-member acting as a slide.

Fig. 5 shows an elevation view of an assembly tongue.

Fig. 6 shows a plan view of said assembly tongue.

Fig. 14 is a perspective view of the key, tongue and cross-member showing the manner in which these elements cooperate with each other.

Figure 1:
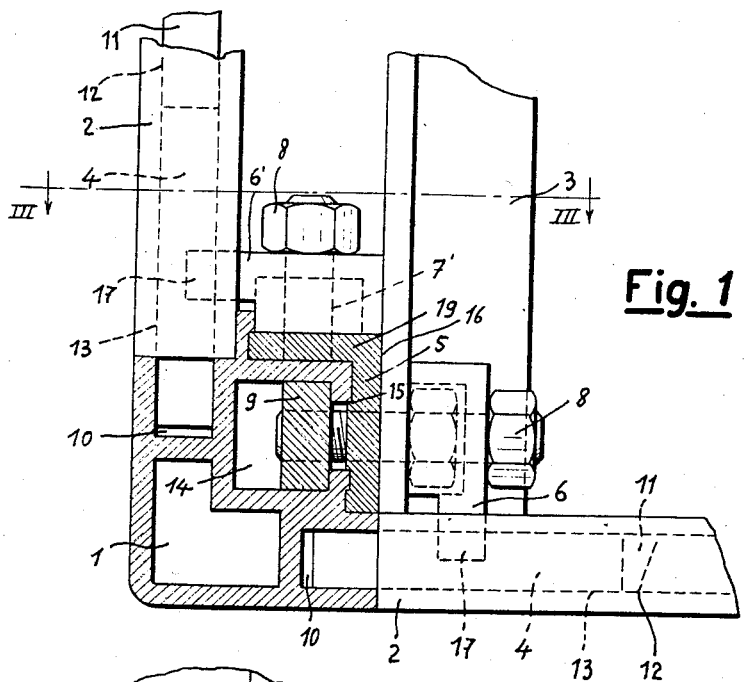
Fig. 1 is a cross-section of an assembly of a corner upright with three cross-members, one acting as a slide.

The metal framework shown in Fig. 1 of the drawings, comprises a vertical upright 1, cross-members 2, a slide 3, assembly tongues 4, a fixing angle member 5, fixing keys 6 and 6¹, two threaded pins 7 and 7¹, three normal nuts 8 and one lozenge-shaped nut 9.

Figure 7:
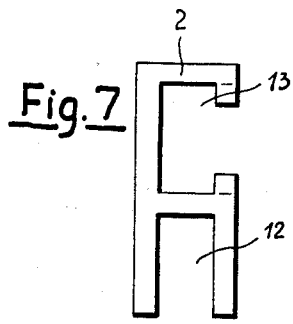
Fig. 7 shows a side view of a horizontal cross-member.

The upright 1 has longitudinal grooves 10 intended for receiving the edge of a panel 11 made of wood or any other material. The cross-members 2 also have a longitudinal groove 12 (Fig. 7), which is intended to receive the other edge of a panel 11, whilst the cross-member 3 whose cross-section is that of an angle iron, constitutes a support or slide for shelves, drawers, or other elements making up an article of furniture.

These cross-members are assembled with the upright in the following manner:

The cross-members 2 include, in addition to the groove 12, a longitudinal groove 13 which will be referred to as the assembly groove, which is intended to receive one end of the tongue 4 whose other end lodges in the grooves 10 of the vertical upright 1. These tongues are intended to hold in one and the same plane the outer surfaces of the vertical upright 1 and those of the horizontal cross-members 2.

Figure 9:
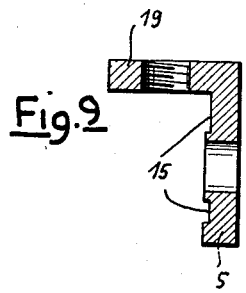
Fig. 9 shows a sectional view of an assembling angle member, along line IX—IX of Fig. 10.
Figure 10:
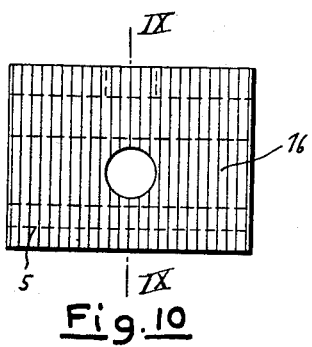
Fig. 10 shows an elevational view of said angle member.
Figure 13:
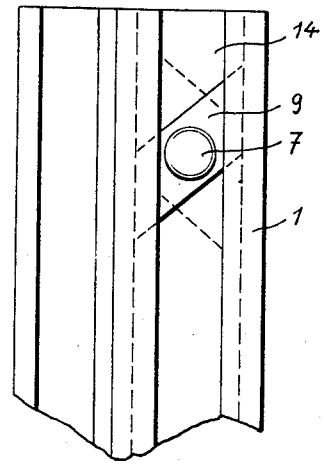
Fig. 13 is a front view of a threaded pin and a lozenge-shaped nut introduced into a special groove in the uprights.
Figure 11:
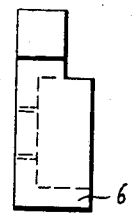
Fig. 11 shows an elevational view of a fixing key.
Figure 12:
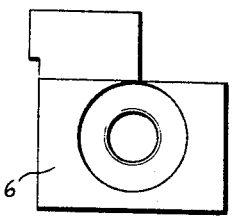
Fig. 12 shows a plan view of said fixing key.

The corner upright 1 has a longitudinal groove 14 of special cross-section intended to receive the lozenge-shaped nut 9 which co-operates with a screw 7 (Fig. 13), in such manner that in a specific position the said nut can be introduced frontally into the groove 14, whilst, after having turned a fraction of a revolution about the screw 7, the said nut is imprisoned in the groove 14. The inner surface of one wall of the fixing member 5 shows grooves 15 (Fig. 9), corresponding to the cross-section of the vertical upright 1. The outer surface of the same wall of the fixing angle member 5 has ribbing 16 (Figs. 3 and 10) which co-operate with longitudinal ribbing 16¹ (Fig. 4) formed on the rear face of a slide 3. The latter is applied tightly against the angle member 5 by a nut 8 which screws onto the screw 7 (Fig. 1). The slide 3 and the angle member 5 are therefore held clamped against the vertical upright 1 by the nut 8 and the lozenge-shaped nut 9. The ribbing 16 guarantees that the assembly formed of these different elements will have perfect rigidity and perpendicularity.

Figure 8:
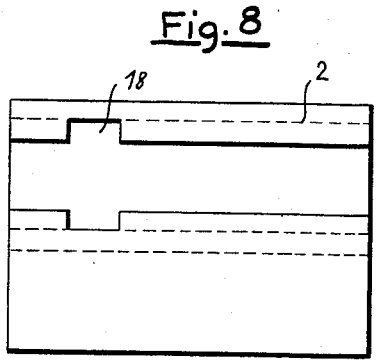
Fig. 8 shows an elevational view of said cross-member.

The tongues 4 (Fig. 5) have a housing 17 for receiving the end of a key 6 or 6¹ which penetrates into a recess 18 (Fig. 8) formed for this purpose in the cross-members 2. The key 6 or 6¹ is thus fast with the cross-member 2 and at the same time prevents the tongue 4 from displacement in the assembly groove 13 formed in a cross-member 2. The key 6 is itself clamped against the slide 3 by a nut 8. It also ensures that cross-member 2 is fixed rigidly against the upright 1 through the intermediary of the notches 18 into which the key 6 penetrates.

In the case of fixing a lateral cross-member, the key 6¹ which is structurally reversed to key 6 is assembled with the angle member 5 by means of a pin 7¹ which is screwed into the wall 19 of the said angle member, and of a nut 8.

A convenient mode of assembling cross members 2 to an upright 1 involves introducing one of the tongues 4 into the corresponding assembly groove 13 of a cross member 2, registering housing 17 of the tongue 4 with notches 18 of the cross member and then inserting a key 6¹ into the housing 17. With the parts so interengaged, the projecting end of tongue 4 is introduced into groove 10 of the upright and at the same time the aperture in key 6¹ is made to receive threaded pin 7¹. A nut 8 then is put into position on the threaded pin 7¹. The same general operation as just described is conveniently repeated using a second tongue 4 and a corresponding key 6¹ at the opposite end of the same cross member 2, that end then being attached to another upright 1 in the manner already suggested. Pins 7 thus are available on the respective uprights 1 and may receive a corresponding slide member 3, inner nuts 8 are applied to the pins 7 in order to hold the slide member in place. Following this, a second cross member 2 is used having a tongue member 4 in its assembly groove 13 and a key 6 is introduced in the corresponding notches 18 in order to engage housing 17 in the tongue 4. The latter cross member 2 then is brought to one of the uprights already connected to the first cross member and tongue 4 in the second cross member is inserted into the remaining available groove 10. In the same operation, the aperture in key 6 receives threaded pin 7 and following this an outer nut 8 is put onto the threaded pin 7. This suggested procedure for assembling the several parts makes it readily understandable that a rectangular frame including cross members 2 on each side and four uprights 1 may be produced.

Figure 2:
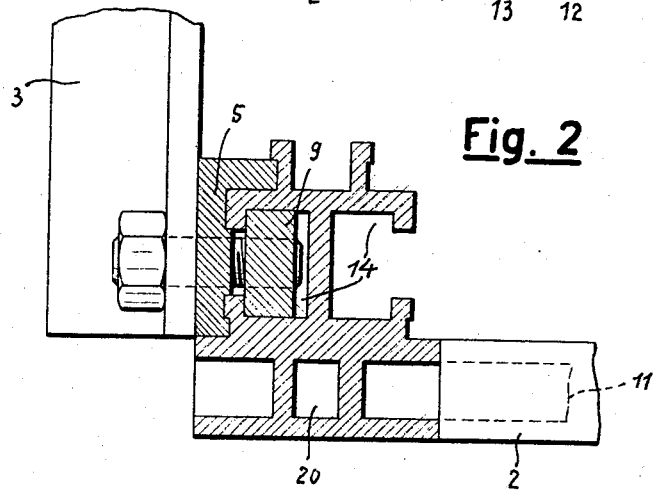
Fig. 2 is a cross-section of an assembly of the central upright with two cross-members, one acting as a slide.

Fig. 2 is a sectional view showing a central upright 20, which differs from the vertical upright 1 in that it has two grooves 14 of special cross-section intended for fixing the angle member 5, and also in that the said two grooves 10 intended to receive one end of the tongues 4 and the edge of a panel 11 are situated in one and the same plane, whilst in the upright 1 these two grooves are situated in planes perpendicular to one another. Otherwise the assembly members described hereinbefore are the same as those illustrated in Fig. 1 and are given the same reference numerals.

The invention is not limited to the form of embodiment which has been described and is illustrated in the drawings. The section members could have different shapes and could be made either in metal or in another material. The form of the grooves in the cross-members 3 could also be different. These cross-members could be U-shaped or T-shaped in cross-section instead of having the present shape. Besides what has been shown in the drawings, the cross-members 2 can be used not only to form the framework for a panel but can also be situated along vertical uprights at any height in order to support shelves or drawers. Where there is no slide 3, the nut is locked directly against the wall of the angle member 5 instead of being locked against the slide 3.

What I claim is:

1. In a framework for furniture or the like, the combination which includes, upright and cross members having recesses respectively entering a side and an end thereof, a tongue slidable longitudinally of said cross member in the recess in said cross member and adapted to project beyond said end of the cross member into the recess entering the side of said upright member, thus to interengage and align said members, and means including a key for fixing said tongue to said cross member in the interengaging position of said tongue with respect to said members, and said means including a fastener for connecting said key in the tongue fixing position to said upright member, accordingly to interconnect said members.

2. In a framework for furniture or the like, the combination as defined in claim 1, in which said recess in said upright member is a groove extending longitudinally of the upright member for receiving along the length of the upright member the end of said tongue projecting beyond the end of the cross member.

3. In a framework for furniture or the like, the combination as defined in claim 2, in which said fastener includes a threaded shank and has a nut threadedly corresponding to said shank for securing said key to the upright member, and said upright member has a longitudinal groove containing said nut and receiving said shank in threaded engagement with said nut, the latter groove being spaced from and substantially parallel to the tongue receiving groove.

4. In a framework for furniture or the like, the combination as defined in claim 3, in which said nut fits the corresponding groove in the upright member so closely that rotation of the nut is arrested by the walls of the corresponding groove.

5. In a framework for furniture or the like, the combination as defined in claim 3, in which said key fits a shaped opening in the side of said cross member and extends into a notch in the side of said tongue.

6. In a framework for furniture or the like, the combination as defined in claim 5, in which said tongue is contained in said cross member in a longitudinal groove in the cross member, and said shaped opening in the side of the cross member is adjacent to the longitudinal groove in that member.

7. In a framework for furniture or the like, the combination as defined in claim 3, in which a fixing member and an angle member are situated between said key and the upright member, said threaded shank extending through both the fixing member and angle member.

8. In a framework for furniture or the like, the combination as defined in claim 7, in which said fixing member and said angle member abut each other and have interengaging ribs extending transversely of said cross member, and in which said fixing member and upright member abut each other and have interengaging ribs extending longitudinally of said upright member.

References Cited in the file of this patent

UNITED STATES PATENTS 1,412,556     Earnshaw _____ Apr. 11, 1922
2,345,650     Attwood _____ Apr. 4, 1944